Figure 1:
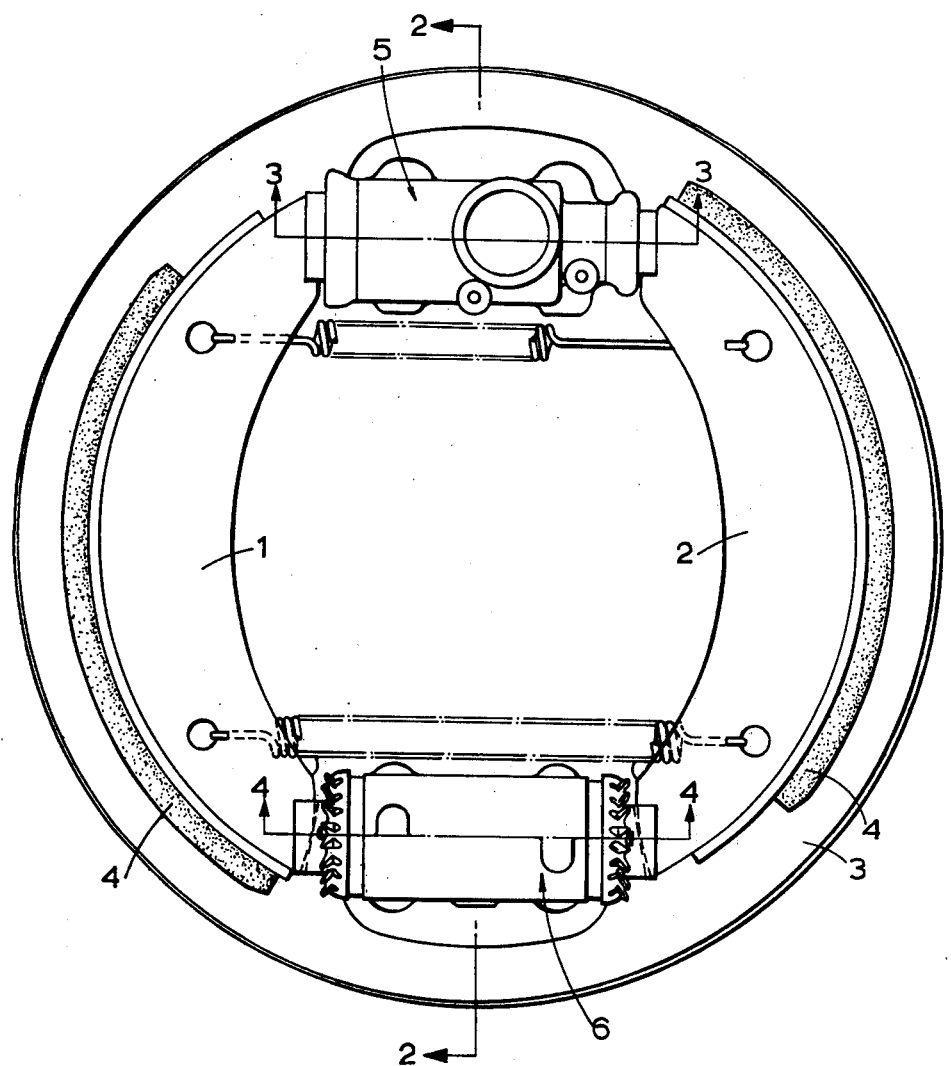

United States Patent [19]
Crabtree

[11] 4,013,150
[45] Mar. 22, 1977

[54] MECHANICALLY AND HYDRAULICALLY OPERATED BRAKE ACTUATOR

[75] Inventor: Norman Crabtree, Worcester, England

[73] Assignee: Girling Limited, Birmingham, England

[22] Filed: Oct. 31, 1975

[21] Appl. No.: 627,839

[30] Foreign Application Priority Data

Nov. 15, 1974 United Kingdom ............ 49435/74

[52] U.S. Cl. .................................. 188/326; 74/110; 74/625; 188/106 F; 188/106 P; 188/343; 188/363; 192/75; 192/83

[51] Int. Cl.² ......................................... F16D 51/22

[58] Field of Search ........ 188/106 P, 106 A, 106 F, 188/326, 343, 362, 363, 365, 368; 74/110, 625; 192/75, 83

[56] References Cited

UNITED STATES PATENTS

| | | | |
|---|---|---|---|
| 2,166,804 | 7/1939 | Dick | 188/326 X |
| 2,347,366 | 4/1944 | Parnell | 188/363 X |

FOREIGN PATENTS OR APPLICATIONS

| | | | |
|---|---|---|---|
| 779,383 | 1/1935 | France | 188/363 |
| 1,253,586 | 11/1971 | United Kingdom | 188/326 |
| 1,135,994 | 12/1968 | United Kingdom | 188/106 A |

Primary Examiner—George E. A. Halvosa
Attorney, Agent, or Firm—Scrivener, Parker, Scrivener and Clarke

[57] ABSTRACT

In an actuator assembly for a vehicle brake a follower member normally operated by a wedge to apply a brake comprises a pair of hydraulic pistons working in a common bore in a housing, and the housing is provided with a supply port communicating with a pressure space defined between the adjacent ends of the pistons which abut when the wedge is displaced, and with an abutment face with which the innermost piston is engageable when the wedge is in its retracted position and the pressure space is pressurized.

4 Claims, 4 Drawing Figures

MECHANICALLY AND HYDRAULICALLY OPERATED BRAKE ACTUATOR

SPECIFIC DESCRIPTION

This invention relates to actuator assemblies for vehicle brakes of the kind comprising a housing in which a wedge member is displaceable from a retracted position into an advanced position to urge two follower members substantially in opposite directions in turn to apply friction members into braking engagement with a rotor, the follower members being formed with surfaces inclined to each other and arranged one on each side of the wedge member, and at least one roller being interposed between each of the said surfaces and co-operating surfaces of the wedge member.

Actuator assemblies of this kind are usually incorporated in vehicle brakes to operate the brake for parking or emergency braking only, but for certain applications it would be advantageous to be able to utilise at least a part of the actuator assembly for normal service braking.

According to our invention in an actuator assembly of the kind set forth for vehicle brakes one of the follower members comprises a pair of hydraulic pistons working in a common bore in the housing, and the housing is provided with a supply port communicating with a pressure space defined between the adjacent ends of the pistons which abut when the wedge member is displaced, and with an abutment face with which the innermost piston is engageable when the wedge member is in its retracted position whereby the pressure space can be pressurised through the supply port to urge the outermost piston away from the innermost relatively stationary piston to apply one of the friction members into braking engagement with the rotor.

Thus the actuator assembly acts as a single-ended hydraulic piston and cylinder assembly for normal service braking with the innermost piston defining a closure for the inner end of the bore. This has the advantage of conserving space in a brake since it is not necessary to embody a separate hydraulic service actuator.

When the actuator assembly is incorporated in a drum brake to separate adjacent shoe ends for parking or emergency braking and an hydraulic actuator is located between the opposite ends of the shoes, our construction of follower member enables the brake to operate as a two leading shoe brake when the drum is rotating in a normal forward direction.

When the drum is rotating in the opposite direction the brake operates as a brake of the one-leading one-trailing type, the outermost piston acting as an abutment for the leading shoe.

Figure 2:
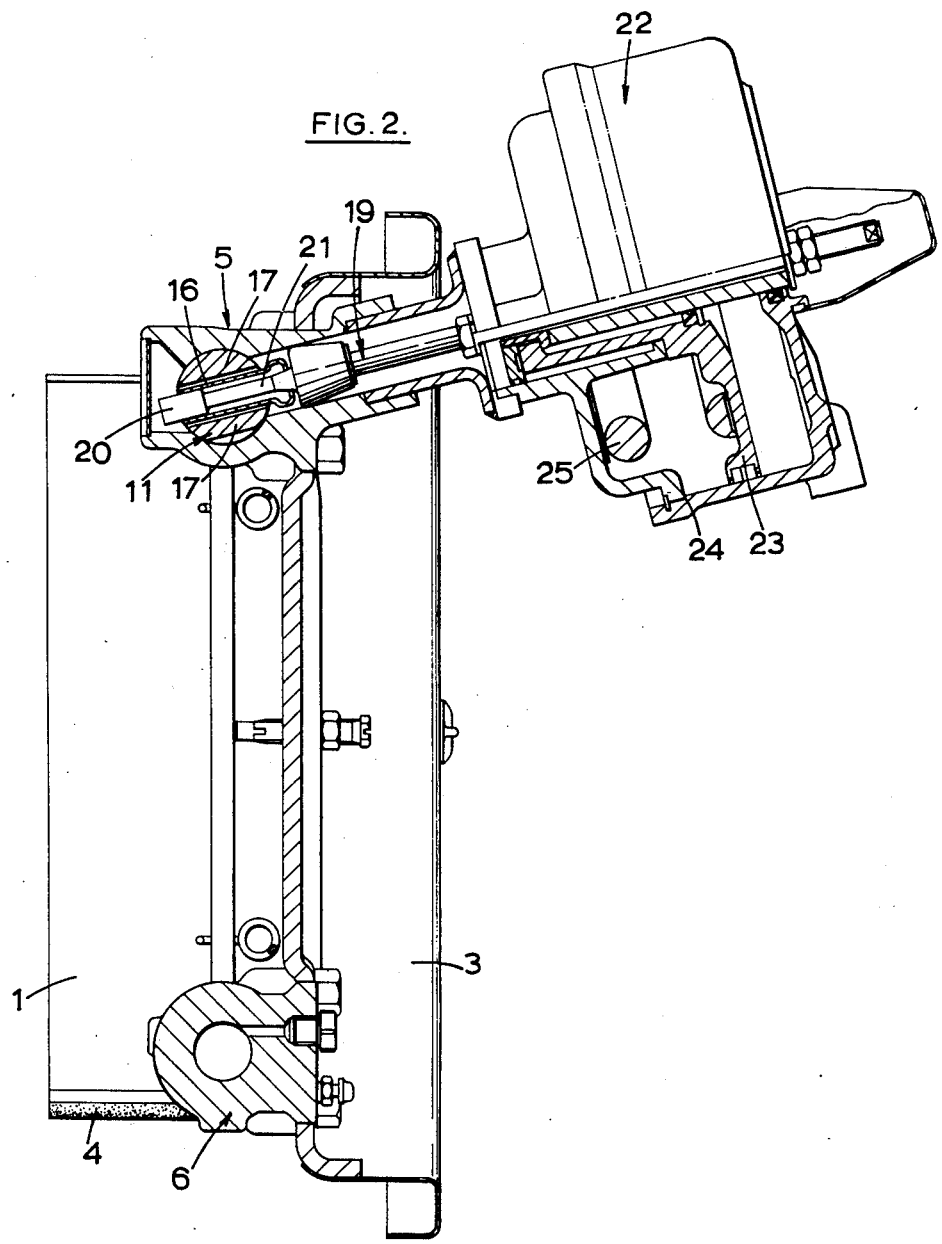
Figure 3:
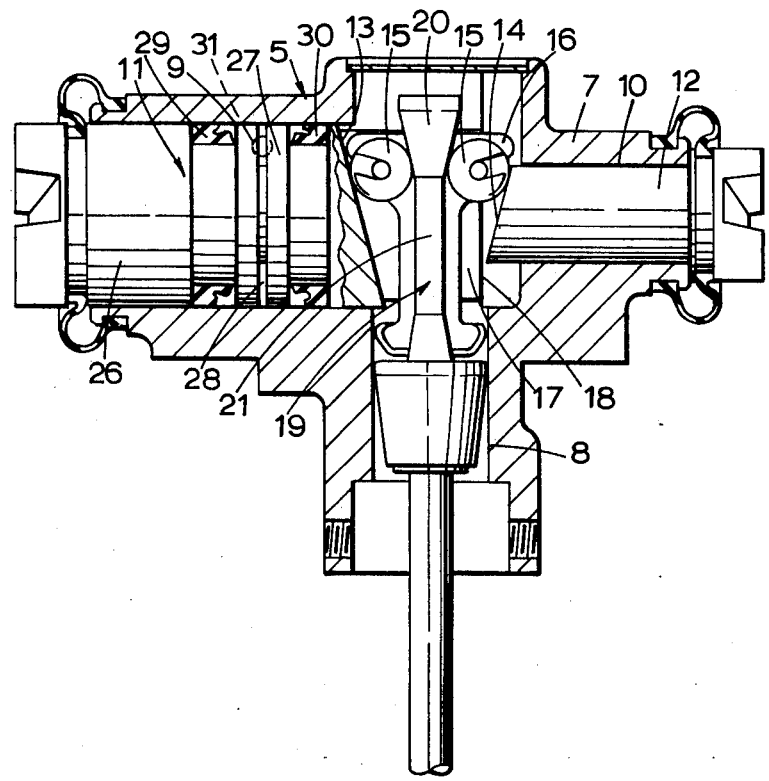
Figure 4:
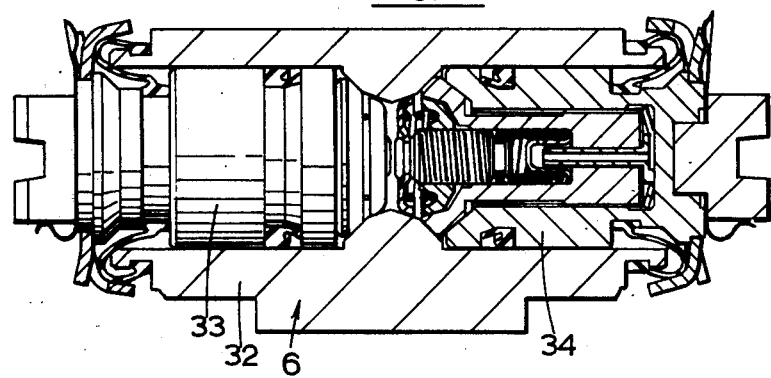

One embodiment of our invention is illustrated in the accompanying drawings in which:

FIG. 1 is a plan of a shoe-drum brake;
FIG. 2 is a section on the line 2—2 of FIG. 1;
FIG. 3 is a section on the line 3—3 of FIG. 1; and
FIG. 4 is a section on the line 4—4 of FIG. 1.

The internal shoe-drum brake illustrated in the drawings comprises a pair of arcuate shoes 1, 2 which are mounted on a stationary back-plate 3 and which carry friction linings 4 for engagement with a rotatable drum (not shown). Actuator assemblies 5, 6 for separating the shoes are mounted on the back-plate between each pair of shoe ends.

The actuator assembly 5 comprises a housing 7 provided on opposite sides of a transverse stepped bore 8 with opposed co-axial bores 9 and 10 of different diameters in which work follower members 11 and 12. The follower members 11 and 12 are adapted at their outer ends to engage one pair of shoe ends and are formed at their inner ends with inclined surfaces 13 and 14 for engagement by rollers 15 carried in a cage 16.

The inner end of the follower member 11 which is of greater diameter is formed with two parallel projections 17 which define a slot for guiding the cage assembly 15, 16 and the inner ends of the projections 17 comprise stop faces which are engageable with an abutment face 18 limiting movement of the follower member 11 into the housing.

A wedge assembly 19 comprising a wedge 20 carried by a rod 21 extends into the bore 8. The wedge 20 acts between the rollers 15 and, when withdrawn by the rod 21, urges the follower members 11, 12 apart to separate the shoe ends.

An operating mechanism 22 is provided for operating the rod 21. The mechanism 22 comprises a piston 23 carrying the rod 21 and working in a cylinder 24 which is connected to the housing 7. Normally the wedge 20 is held in the retracted inoperative position illustrated in FIG. 3 of the drawings by the application of fluid pressure, conveniently hydraulic, to the side of the piston 23 opposite the wedge 20 in opposition to the force in a compression spring 25 acting between the cylinder 24 and the opposite face of the piston 23. When the fluid pressure acting on the piston 23 is released, the stored energy in the spring 25 is also released to withdraw the wedge 20 into an operative position to separate the shoe ends for parking or emergency braking as described above with the opposite ends of the shoes engaging with the then inoperative actuator 6.

According to our invention the follower member 11 comprises two hydraulic pistons 26 and 27. Both pistons 26 and 27 work in the bore 9, and engage at adjacent ends to form a strut when the wedge 20 is operated. The pistons 26 and 27 are reduced in diameter at their adjacent edges to define a pressure space 28 therebetween and in the region of the bore 9 between piston seals 29 and 30.

The housing is provided with a supply port 31 for connection to a source of hydraulic pressure, conveniently an hydraulic master cylinder, to pressurise the pressure space 28 and separate the pistons 26 and 27. Since the innermost piston 27 engages with the abutment face 18, that piston forms a closure for the inner end of the bore 9 with the result that the outermost piston 26 moves out of the bore to apply the shoe 1 to the drum.

The actuator 6 comprises an hydraulic cylinder 32 in which work opposed hydraulic pistons 33 and 34 adapted to be separated by hydraulic pressure applied between adjacent ends from the same or a different supply of hydraulic pressure.

Thus for normal service braking the actuators 5 and 6 are both operated hydraulically. When the drum is rotating in a normal forward direction, anti-clockwise as shown in FIG. 1, the pistons 26 and 34 act on the shoes so that the brake operates as a brake of the two-leading shoe type. When the drum is rotating in the opposite direction the brake acts as a brake of on one-leading one-trailing shoe type since no thrust is transmitted to the shoe 2 from the actuator 5.

When the pressure of hydraulic fluid in the pressure space 28 is released subsequent to application of the parking brake by the spring 25, the innermost piston 27 will be moved outwardly to engage with the piston 26, so that release of pressure in the space 28 will not render the parking brake inoperative.

A brake embodying our invention is highly efficient both as a service brake in the normal forward direction of drum rotation, and also for use as a parking or emergency brake. However, it is less effective as a service brake when the drum is rotating in a reverse direction. This is an advantage since the brake is unable to generate sufficient torque to cause itself damage. This might otherwise occur in an overloaded vehicle, for example a tipper truck, where there is a massive transference of weight onto the rear wheels when the brakes are applied rapidly in an attempt to shoot the load off the truck with the vehicle travelling in a reverse direction.

I claim:

1. An actuator assembly for a vehicle brake comprising a housing, a wedge member, two follower members slidably guided in said housing and formed with thrust receiving surfaces which are inclined to each other and between which said wedge member is disposed, and at least one roller interposed between each of said thrust receiving surfaces and said wedge member, said wedge member being displaceable from a retracted position into an advanced position to urge said follower members in opposite directions to apply friction members into braking engagement with a rotor, wherein one of said follower members comprises a pair of axially arranged innermost and outermost hydraulic pistons working in a common bore in said housing, said outermost piston having an outer face for engagement with one of said friction members and an inner face, and said innermost piston being provided with the said thrust receiving surface for the said one follower member and having an outer face for engagement with said inner face of said outermost piston, and a stop surface spaced axially from said outer face in an inward direction, and said housing is provided with a supply port communicating with a pressure space defined in said common bore between said inner face of said outermost piston and said outer face of said innermost piston, which said faces abut when said wedge member is displaced from said retracted position, and with an abutment face with which said stop surface on said innermost piston is engageable when said wedge member is in said retracted position whereby said pressure space can be pressurised through said supply port to urge said outermost piston away from said innermost piston which is relatively stationary to apply one of the friction members into braking engagement with the rotor.

2. An actuator assembly as claimed in claim 1, wherein said innermost piston has an inner end formed with two parallel projections forming said stop surface and which define a slot for guiding a cage assembly in which said roller is carried, and inner ends of said projections comprise stop faces engageable with said abutment face.

3. An internal shoe-drum brake for a vehicle comprising a rotatable drum, first and second arcuate shoes for engagement with said rotatable drum, and first and second actuator assemblies for separating said shoes located between each pair of shoe ends, said first actuator assembly comprising a housing, a wedge member, first and second follower members slidably guided in said housing and formed with thrust receiving surfaces which are inclined to each other and between which said wedge member is disposed, and at least one roller interposed between each of said thrust receiving surfaces and said wedge member, said wedge member being displaceable from a retracted position to urge said follower members in opposite directions to apply said shoes to said drum, wherein one of said follower members comprises a pair of axially arranged innermost and outermost hydraulic pistons working in a common bore in said housing, said outermost piston having an outer face for engagement with said first shoe and an inner face, and said innermost piston being provided with the said thrust receiving surface for the said one follower member and having an outer face for engagement with said inner face of said outermost piston, and a stop surface spaced axially from said outer face in an inward direction, and said housing is provided with a supply port communicating with a pressure space defined in said common bore between said inner face of said outermost piston and said outer face of said innermost piston, which said faces abut when said wedge member is displaced from said retracted position, and with an abutment face with which said stop surface of said innermost piston is engageable when said wedge member is in said retracted position whereby said pressure space can be pressurised through said supply port to urge said outermost piston away from said innermost piston which is relatively stationary to apply said first shoe to said drum, said second actuator including an hydraulic cylinder, and a piston working in said hydraulic cylinder and acting on the shoe end of said second shoe which is remote from said first actuator, the arrangement being such that when both actuators are operated hydraulically and simultaneously by pressurising said pressure space and said hydraulic cylinder simultaneously said brake operates as a brake of the two leading shoe type, at least for one direction of drum rotation.

4. An internal shoe drum brake as claimed in claim 3, wherein said second actuator also includes a second hydraulic cylinder and a second piston working in an hydraulic cylinder and acting on the shoe end of said first shoe which is remote from said first actuator, the arrangement being such that when both actuators are operated hydraulically and simultaneously by pressurising said pressure space and both said hydraulic cylinders simultaneously said brake operates as a brake of the one-leading one-trailing shoe type at least for an opposite direction of drum rotation, and said outermost piston of said first actuator acts as a drag-taking abutment for said first shoe.

* * * * *